United States Patent
Mori et al.

(10) Patent No.: US 10,106,667 B2
(45) Date of Patent: Oct. 23, 2018

(54) RUBBER COMPOSITION AND PNEUMATIC TIRE COMPRISING TREAD FORMED FROM SAID RUBBER COMPOSITION

(71) Applicant: SUMITOMO RUBBER INDUSTRIES, LTD., Kobe-shi, Hyogo (JP)

(72) Inventors: Kenji Mori, Kobe (JP); Toshifumi Haba, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 32 days.

(21) Appl. No.: 15/345,769

(22) Filed: Nov. 8, 2016

(65) Prior Publication Data
US 2017/0158839 A1 Jun. 8, 2017

(30) Foreign Application Priority Data

Dec. 4, 2015 (JP) ................. 2015-237741

(51) Int. Cl.
| | |
|---|---|
| *C08K 3/36* | (2006.01) |
| *C08K 3/04* | (2006.01) |
| *C08F 236/06* | (2006.01) |
| *B60C 1/00* | (2006.01) |
| *C08F 236/08* | (2006.01) |
| *C08L 9/00* | (2006.01) |

(52) U.S. Cl.
CPC .............. *C08K 3/36* (2013.01); *B60C 1/0016* (2013.01); *C08F 236/06* (2013.01); *C08F 236/08* (2013.01); *C08K 3/04* (2013.01); *C08L 9/00* (2013.01)

(58) Field of Classification Search
CPC .................. C08F 236/06; C08L 9/00
See application file for complete search history.

(56) References Cited

U.S. PATENT DOCUMENTS

2003/0144401 A1* 7/2003 Ajbani ................. B60C 1/0008
524/445
2014/0155521 A1 6/2014 Miyazaki

FOREIGN PATENT DOCUMENTS

| | | | |
|---|---|---|---|
| JP | 2013-53296 A | 3/2013 | |
| JP | 5652205 B2 * | 1/2015 | ............. C08C 19/02 |
| WO | WO-2010038720 A1 * | 4/2010 | ............. C08C 19/02 |

OTHER PUBLICATIONS

Machine translation of JP 5655205 B2, published Jan. 14, 2015.*

* cited by examiner

*Primary Examiner* — Vickey Nerangis
(74) *Attorney, Agent, or Firm* — Birch, Stewart, Kolasch & Birch, LLP

(57) ABSTRACT

Provided are a rubber composition that shows a balanced improvement in fuel economy, abrasion resistance, and wet grip performance while having good processability, and a pneumatic tire including a tread formed from the rubber composition. The present invention relates to a rubber composition containing: a copolymer synthesized by copolymerizing a conjugated diene monomer and a compound represented by the formula (1) below; and carbon black and/or silica,

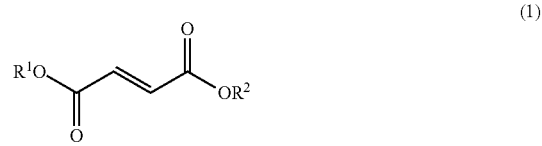
(1)

wherein $R^1$ and $R^2$ are the same or different and each represent a hydrogen atom or a C1-C30 hydrocarbon group.

11 Claims, No Drawings

RUBBER COMPOSITION AND PNEUMATIC TIRE COMPRISING TREAD FORMED FROM SAID RUBBER COMPOSITION

TECHNICAL FIELD

The present invention relates to a rubber composition and a pneumatic tire including a tread formed from the rubber composition.

BACKGROUND ART

Tire treads are required to have high level properties, such as mainly high fuel economy, high abrasion resistance, and high wet grip performance. Various techniques for improving these properties have been examined.

For example, fuel economy is known to be improved by introducing a functional group having an affinity for filler into the polymer chain end; abrasion resistance is known to be improved by using a high molecular weight polymer having a molecular weight of 250,000 or more; and wet grip performance is known to be improved by using a polymer having a high glass transition temperature (Tg).

However, the introduction of a functional group having an affinity for filler, the use of a high molecular weight polymer, and the use of a polymer having a high Tg obtained by increasing the styrene content all unfortunately lead to an increase in the hardness of the rubber composition and deterioration of the processability.

Patent Literature 1 discloses a tire rubber composition having fuel economy, abrasion resistance, and wet grip performance that are improved by incorporation of a liquid resin having a softening point of −20° C. to 45° C. and a specific silica. However, there is still room for improvement in achieving a balanced improvement in these properties while providing good processability.

CITATION LIST

Patent Literature

Patent Literature 1: JP 2013-053296 A

SUMMARY OF INVENTION

Technical Problem

The present invention aims to solve the above problem and provide a rubber composition that shows a balanced improvement in fuel economy, abrasion resistance, and wet grip performance while having good processability, and a pneumatic tire including a tread formed from the rubber composition.

Solution to Problem

The present invention relates to a rubber composition, containing: a copolymer synthesized by copolymerizing a conjugated diene monomer and a compound represented by the formula (1) below; and at least one of carbon black or silica,

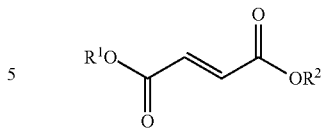

(1)

wherein $R^1$ and $R^2$ are the same or different and each represent a hydrogen atom or a C1-C30 hydrocarbon group.

The copolymer preferably contains, per 100% by mass of structural units of the copolymer, 5% to 95% by mass of units derived from the conjugated diene monomer and 5% to 95% by mass of units derived from the compound of formula (1).

Preferably, the copolymer is synthesized by emulsion polymerization, and the copolymer has a weight average molecular weight of 5,000 to 2,000,000 and a molecular weight distribution of 2.1 to 11.

$R^1$ and $R^2$ are preferably ethyl groups.

The conjugated diene monomer is preferably 1,3-butadiene.

Preferably, the copolymer is synthesized by further emulsion polymerization of a compound represented by the formula (2) below, and the copolymer contains 1% to 50% by mass of units derived from this comonomer per 100% by mass of structural units of the copolymer,

(2)

wherein $R^{21}$ represents a hydrogen atom, a C1-C3 aliphatic hydrocarbon group, a C3-C8 alicyclic hydrocarbon group, or a C6-C10 aromatic hydrocarbon group, and $R^{22}$ represents a hydrogen atom or a methyl group.

The copolymer is preferably synthesized using as a chain transfer agent a compound that contains a functional group having an affinity for filler, and a mercapto group.

The present invention also relates to a pneumatic tire, including a tread formed from the rubber composition.

Advantageous Effects of Invention

The rubber composition of the present invention contains a copolymer synthesized by copolymerizing a conjugated diene monomer and a compound represented by the above formula (1), and carbon black and/or silica. The use of such a rubber composition leads to a balanced improvement in fuel economy, abrasion resistance, and wet grip performance while providing good processability.

DESCRIPTION OF EMBODIMENTS

The rubber composition of the present invention contains a copolymer synthesized by copolymerizing a conjugated diene monomer and a compound represented by the above formula (1), and carbon black and/or silica. The use of carbon black or silica with a copolymer obtained by copolymerizing a conjugated diene monomer and further a compound represented by the formula (1) as monomers enables production of a rubber composition that has good processability before vulcanization and further achieves a balanced improvement in fuel economy, abrasion resistance, and wet grip performance. Thus, a rubber composition that is excellent in the balance of these properties can be provided.

The structural units of the copolymer include monomer units derived from a conjugated diene monomer. The conjugated diene monomer preferably has 4 to 8 carbon atoms, and examples include 1,3-butadiene, isoprene, and 2,3-dimethyl-1,3-butadiene. In view of fuel economy, abrasion resistance, and wet grip performance, 1,3-butadiene or isoprene is preferred among these, with 1,3-butadiene being more preferred. Each of these monomers may be used alone, or two or more of these may be used in combination.

In the copolymer, the amount of units derived from the conjugated diene monomer per 100% by mass of the structural units of the copolymer is preferably 5% by mass or more, more preferably 30% by mass or more, still more preferably 50% by mass or more, particularly preferably 60% by mass or more. The amount is also preferably 95% by mass or less, more preferably 90% by mass or less, still more preferably 80% by mass or less. If the amount is less than 5% by mass, abrasion resistance may be reduced. If the amount is more than 95% by mass, fuel economy may be reduced.

The structural units of the copolymer include monomer units derived from a compound represented by the formula (1) below. When the copolymer has monomer units derived from a compound represented by the formula (1) below together with the monomer units derived from a conjugated diene monomer, preferably 1,3-butadiene, a balanced improvement in fuel economy, abrasion resistance, and wet grip performance can be achieved while obtaining good processability.

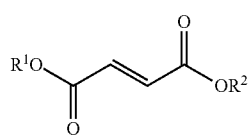

In formula (1), $R^1$ and $R^2$ are the same or different and each represent a hydrogen atom or a C1-C30 hydrocarbon group.

Examples of the hydrocarbon group for $R^1$ and $R^2$ include acyclic hydrocarbon groups, preferably aliphatic hydrocarbon groups, which may be linear or branched. The hydrocarbon group preferably has 1 to 20 carbon atoms, more preferably 1 to 10 carbon atoms, still more preferably 1 to 3 carbon atoms. Preferred examples of the hydrocarbon group include alkyl groups whose carbon number is preferably as described above. Examples of the alkyl groups include methyl, ethyl, n-propyl, isopropyl, n-butyl, isobutyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups.

$R^1$ and $R^2$ are each preferably a hydrogen atom or a C1-C3 alkyl group, more preferably a C1-C3 alkyl group, still more preferably an ethyl group. In such case, the effects of the present invention can be better achieved.

Specific examples of the compound of formula (1) include fumaric acid, monomethyl fumarate, dimethyl fumarate, monoethyl fumarate, diethyl fumarate, monopropyl fumarate, dipropyl fumarate, monoisopropyl fumarate, diisopropyl fumarate, monobutyl fumarate, dibutyl fumarate, and 1-ethyl-4-methyl fumarate. Preferred among these are diethyl fumarate, dibutyl fumarate, and diisopropyl fumarate because they contribute to significantly improving the balance of fuel economy, abrasion resistance, and wet grip performance while providing good processability. Each of these compounds may be used alone, or two or more of these may be used in combination.

In the copolymer, the amount of units derived from the compound of formula (1) per 100% by mass of the structural units of the copolymer is preferably 5% by mass or more, more preferably 8% by mass or more, still more preferably 10% by mass or more, particularly preferably 20% by mass or more. The amount is also preferably 95% by mass or less, more preferably 70% by mass or less, still more preferably 50% by mass or less, particularly preferably 40% by mass or less. If the amount is less than 5% by mass, fuel economy may be reduced. If the amount is more than 95% by mass, abrasion resistance may be reduced.

The copolymer may have as structural units monomer units derived from monomers other than the conjugated diene monomer and the compound of formula (1).

In the copolymer, the combined amount of units derived from the conjugated diene monomer and the compound of formula (1), per 100% by mass of the structural units of the copolymer, is preferably 60% by mass or more, more preferably 80% by mass or more, still more preferably 90% by mass or more, and may be 100% by mass. When the combined amount falls within the range indicated above, the effects of the present invention can be better achieved.

The structural units of the copolymer preferably include monomer units derived from a compound represented by the formula (2) below. When the copolymer has monomer units derived from the compound of formula (2), preferably styrene, in addition to the above structural units, wet grip performance and abrasion resistance, especially wet grip performance, can be more significantly improved, and the balance of fuel economy, abrasion resistance, and wet grip performance can be more significantly improved while achieving good processability.

In formula (2), $R^{21}$ represents a hydrogen atom, a C1-C3 aliphatic hydrocarbon group, a C3-C8 alicyclic hydrocarbon group, or a C6-C10 aromatic hydrocarbon group, and $R^{22}$ represents a hydrogen atom or a methyl group.

Examples of the C1-C3 aliphatic hydrocarbon group in the compound of formula (2) include C1-C3 alkyl groups such as methyl, ethyl, n-propyl, and isopropyl groups, with a methyl group being preferred.

Examples of the C3-C8 alicyclic hydrocarbon group in the compound of formula (2) include cyclopropyl, cyclobutyl, cyclopentyl, cyclohexyl, cycloheptyl, cyclooctyl, cyclopropenyl, cyclobutenyl, cyclopentenyl, cyclohexenyl, cycloheptenyl, and cyclooctenyl groups.

Examples of the C6-C10 aromatic hydrocarbon group in the compound of formula (2) include phenyl, benzyl, phenethyl, tolyl, xylyl, and naphthyl groups. Among these, phenyl, tolyl, and naphthyl groups are preferred, with a phenyl group being more preferred, because of their high reactivity.

$R^{21}$ is preferably a C6-C10 aromatic hydrocarbon group. $R^{22}$ is preferably a hydrogen atom.

Examples of the compound of formula (2) include styrene, 2-methylstyrene, 3-methylstyrene, 4-methylstyrene, α-methylstyrene, 2,4-dimethylstyrene, vinylethylbenzene, α-vinylnaphthalene, β-vinylnaphthalene, and vinylxylene. Among these, styrene, α-methylstyrene, α-vinylnaphthalene, and β-vinylnaphthalene are preferred, with styrene being more preferred, because of their high reactivity.

In the copolymer, the amount of units derived from the compound of formula (2) per 100% by mass of the structural units of the copolymer is preferably 1% by mass or more, more preferably 5% by mass or more, still more preferably 10% by mass or more. The amount is also preferably 50% by mass or less, more preferably 30% by mass or less, still more preferably 20% by mass or less. When the amount falls within the range indicated above, the effects of the present invention can be sufficiently achieved.

In the copolymer, the combined amount of units derived from the compound of formula (1) and the compound of formula (2), per 100% by mass of the structural units of the copolymer, is preferably 5% by mass or more, more preferably 8% by mass or more, still more preferably 10% by mass or more, particularly preferably 15% by mass or more. The combined amount is also preferably 95% by mass or less, more preferably 70% by mass or less, still more preferably 50% by mass or less, particularly preferably 40% by mass or less, most preferably 30% by mass or less. When the combined amount falls within the range indicated above, the effects of the present invention can be sufficiently achieved.

In the copolymer, the amounts of units derived from the conjugated diene monomer, units derived from the compound of formula (1), and other monomer units can be measured by NMR.

The copolymer may be produced by any copolymerization method, such as solution polymerization, emulsion polymerization, gas phase polymerization, or bulk polymerization. Emulsion polymerization is preferred because this method allows for high-yield production of copolymers with a high degree of monomer randomness.

In the case of emulsion polymerization, the copolymer can be synthesized by known emulsion polymerization methods. For example, the copolymer may be more suitably produced by a method including the steps of: emulsifying the monomers constituting the copolymer, i.e. the diene monomer and the compound of formula (1), and optionally the compound of formula (2), in water using an emulsifier; and adding a free radical initiator to the resulting emulsion to cause free radical polymerization.

The emulsion may be prepared by known emulsification methods using emulsifiers. The emulsifier is not particularly limited, and may be any known material, such as fatty acid salts or rosin acid salts. Examples of fatty acid salts and rosin acid salts include potassium or sodium salts of capric acid, lauric acid, and myristic acid.

The emulsion polymerization may be carried out by known methods using free radical polymerization initiators. Any free radical polymerization initiator may be used including known materials. Examples include redox initiators such as paramenthane hydroperoxide and persulfates such as ammonium persulfate.

The temperature of emulsion polymerization may be appropriately adjusted according to the type of free radical initiator used, and it preferably ranges from −30° C. to 50° C., more preferably from −10° C. to 20° C.

The emulsion polymerization can be stopped by adding a polymerization terminator to the polymerization system. Any polymerization terminator may be used including known materials, such as N,N'-dimethyldithiocarbamate, diethylhydroxylamine, or hydroquinone.

The copolymer in the present invention is preferably produced by emulsion polymerization in the presence of a chain transfer agent. The thus produced copolymer further improves processability, fuel economy, and abrasion resistance.

The chain transfer agent refers to an agent for controlling free radical polymerization which can act on the growing polymer chain end to terminate the polymer growth while generating a new polymerization-initiating radical. This agent enables control of the molecular weight and molecular weight distribution of the polymer (decrease in molecular weight and narrowing of molecular weight distribution), control of the polymer chain end structure, and the like.

Examples of the chain transfer agent include compounds containing a mercapto group, such as n-octyl mercaptan, n-nonyl mercaptan, n-decyl mercaptan, n-dodecyl mercaptan, t-dodecyl mercaptan, and n-hexadecyl mercaptan, with t-dodecyl mercaptan being preferred as it can readily control the molecular weight.

The chain transfer agent may also suitably be a compound that contains a functional group having an affinity for filler, and a mercapto group. When the compound that contains a mercapto group and further a functional group having an affinity for filler is used as the chain transfer agent, the functional group having an affinity for filler can be introduced into the polymer chain end, thereby more significantly improving fuel economy, wet grip performance, and abrasion resistance. Examples of the functional group having an affinity for filler include amino, amide, alkoxysilyl, isocyanate, imino, imidazole, urea, ester, ether, carbonyl, carboxyl, hydroxyl, nitrile, and pyridyl groups. Preferred among these are alkoxysilyl and ester groups. The term "filler" herein refers to reinforcing filler such as carbon black or silica.

The compound containing an alkoxysilyl group may suitably be a compound represented by the formula (3) below. With such a compound, fuel economy, wet grip performance, and abrasion resistance can be more significantly improved.

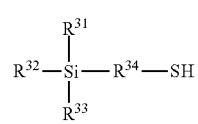

(3)

In formula (3), $R^{31}$ to $R^{33}$ each represent a branched or unbranched C1-C12 alkyl group, a branched or unbranched C1-C12 alkoxy group, or a group represented by —O—$(R^{35}$—O$)_z$—$R^{36}$ where each of the $R^{35}$ groups, whose number is z, may be the same or different and represents a branched or unbranched divalent C1-C30 hydrocarbon group, $R^{36}$ represents a branched or unbranched C1-C30 alkyl group, a branched or unbranched C2-C30 alkenyl group, a C6-C30 aryl group, or a C7-C30 aralkyl group, and z represents an integer of 1 to 30, provided that at least one of the $R^{31}$ to $R^{33}$ groups is a branched or unbranched C1-C12 alkoxy group, and $R^{31}$ to $R^{33}$ may be the same as or different from one another; and $R^{34}$ represents a branched or unbranched C1-C6 alkylene group.

$R^{31}$ to $R^{33}$ each represent a branched or unbranched C1-C12 alkyl group, a branched or unbranched C1-C12 alkoxy group, or a group represented by —O—$(R^{35}$—O$)_z$—$R^{36}$, and at least one of the $R^{31}$ to $R^{33}$ groups is a branched or unbranched C1-C12 alkoxy group.

Further, at least one of the $R^{31}$ to $R^{33}$ groups is preferably a group represented by $-O-(R^{35}-O)_z-R^{36}$ in order to better achieve the effects of the present invention. More preferably, the other two of $R^{31}$ to $R^{33}$ are groups represented by $-O-(R^{35}-O)_z-R^{36}$.

Also preferably, all of $R^{31}$ to $R^{33}$ are branched or unbranched C1-C12, preferably C1-C5, more preferably C1-C3 alkoxy groups.

Examples of the branched or unbranched C1-C12, preferably C1-C5, alkyl group for $R^{31}$ to $R^{33}$ include methyl, ethyl, n-propyl, isopropyl, n-butyl, iso-butyl, sec-butyl, tert-butyl, pentyl, hexyl, heptyl, 2-ethylhexyl, octyl, and nonyl groups.

Examples of the branched or unbranched C1-C12, preferably C1-C5, more preferably C1-C3, alkoxy group for $R^{31}$ to $R^{33}$ include methoxy, ethoxy, n-propoxy, isopropoxy, n-butoxy, iso-butoxy, sec-butoxy, tert-butoxy, pentyloxy, hexyloxy, heptyloxy, 2-ethylhexyloxy, octyloxy, and nonyloxy groups.

In the group: $-O-(R^{35}-O)_z-R^{36}$ for $R^{31}$ to $R^{33}$, $R^{35}$ represents a branched or unbranched divalent C1-C30, preferably C1-C15, more preferably C1-C3 hydrocarbon group.

Examples of the hydrocarbon group include branched or unbranched C1-C30 alkylene groups, branched or unbranched C2-C30 alkenylene groups, branched or unbranched C2-C30 alkynylene groups, and C6-C30 arylene groups, with branched or unbranched C1-C30 alkylene groups being preferred.

Examples of branched or unbranched C1-C30, preferably C1-C15, more preferably C1-C3 alkylene groups for $R^{35}$ include methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, and octadecylene groups.

Examples of branched or unbranched C2-C30, preferably C2-C15, more preferably C2-C3 alkenylene groups for $R^{35}$ include vinylene, 1-propenylene, 2-propenylene, 1-butenylene, 2-butenylene, 1-pentenylene, 2-pentenylene, 1-hexenylene, 2-hexenylene, and 1-octenylene groups.

Examples of branched or unbranched C2-C30, preferably C2-C15, more preferably C2-C3 alkynylene groups for $R^{35}$ include ethynylene, propynylene, butynylene, pentynylene, hexynylene, heptynylene, octynylene, nonynylene, decynylene, undecynylene, and dodecynylene groups.

Examples of C6-C30, preferably C6-C15 arylene groups for $R^{35}$ include phenylene, tolylene, xylylene, and naphthylene groups.

The symbol z represents an integer of 1 to 30, preferably of 2 to 20, more preferably of 3 to 7, still more preferably of 5 to 6.

$R^{36}$ represents a branched or unbranched C1-C30 alkyl group, a branched or unbranched C2-C30 alkenyl group, a C6-C30 aryl group, or a C7-C30 aralkyl group. Among these, $R^{36}$ is preferably a branched or unbranched C1-C30 alkyl group.

Examples of the branched or unbranched C1-C30, preferably C3-C25, more preferably C10-C15, alkyl group for $R^{36}$ include methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups.

Examples of the branched or unbranched C2-C30, preferably C3-C25, more preferably C10-C15, alkenyl group for $R^{36}$ include vinyl, 1-propenyl, 2-propenyl, 1-butenyl, 2-butenyl, 1-pentenyl, 2-pentenyl, 1-hexenyl, 2-hexenyl, 1-octenyl, decenyl, undecenyl, dodecenyl, tridecenyl, tetradecenyl, pentadecenyl, and octadecenyl groups.

Examples of the C6-C30, preferably C10-C20, aryl group for $R^{36}$ include phenyl, tolyl, xylyl, naphthyl, and biphenyl groups.

Examples of the C7-C30, preferably C10-C20, aralkyl group for $R^{36}$ include benzyl and phenethyl groups.

Specific examples of the group represented by $-O-(R^{35}-O)_z-R^{36}$ include $-O-(C_2H_4-O)_5-C_{11}H_{23}$, $-O-(C_2H_4-O)_5-C_{12}H_{25}$, $-O-(C_2H_4-O)_5-C_{13}H_{27}$, $-O-(C_2H_4-O)_5-C_{14}H_{29}$, $-O-(C_2H_4-O)_5-C_{15}H_{31}$, $-O-(C_2H_4-O)_3-C_{13}H_{27}$, $-O-(C_2H_4-O)_4-C_{13}H_{27}$, $-O-(C_2H_4-O)_6-C_{13}H_{27}$, and $-O-(C_2H_4-O)_7-C_{13}H_{27}$. Preferred among these are $-O-(C_2H_4-O)_5-C_{11}H_{23}$, $-O-(C_2H_4-O)_5-C_{13}H_{27}$, $-O-(C_2H_4-O)_5-C_{15}H_{31}$ and $-O-(C_2H_4-O)_6-C_{13}H_{27}$.

Examples of the branched or unbranched C1-C6, preferably C1-C5, alkylene group for $R^{34}$ include those as described for the branched or unbranched C1-C30 alkylene group for $R^{35}$.

Examples of the compound of formula (3) include 3-mercaptopropyltrimethoxysilane, 3-mercaptopropyltriethoxysilane, 2-mercaptoethyltrimethoxysilane, 2-mercaptoethyltriethoxysilane, and a compound (Si363 available from EVONIK-DEGUSSA) represented by the formula below. In order to better achieve the effects of the present invention, 3-mercaptopropyltriethoxysilane or the compound of the formula below may suitably be used, with the compound of the formula below being preferred. Each of these compounds may be used alone, or two or more of these may be used in combination.

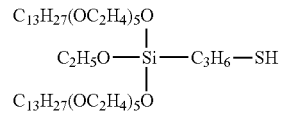

The compound containing an ester group may suitably be a compound represented by the formula (4) below. With such a compound, fuel economy, wet grip performance, and abrasion resistance can be more significantly improved.

In formula (4), $R^{41}$ represents a branched or unbranched C1-C12 alkyl group, $R^{42}$ represents a branched or unbranched C1-C6 alkylene group, and A represents an ester group represented by $-COO-$ or $-OCO-$.

Examples of the branched or unbranched C1-C12, preferably C5-C10, alkyl group for $R^{41}$ include those as described for the branched or unbranched C1-C12 alkyl group for $R^{31}$ to $R^{33}$.

Examples of the branched or unbranched C1-C6, preferably C1-C3, alkylene group for $R^{42}$ include C1-C6 groups as described for the branched or unbranched C1-C30 alkylene group for $R^{35}$.

The compound of formula (4) may suitably be, for example, methyl 3-mercaptopropionate, ethyl 3-mercaptopropionate, propyl 3-mercaptopropionate, butyl 3-mercaptopropionate, pentyl 3-mercaptopropionate, hexyl 3-mercaptopropionate, heptyl 3-mercaptopropionate, octyl 3-mercaptopropionate, 2-ethylhexyl 3-mercaptopropionate, 2-ethylhexyl mercaptoethanoate, 2-mercaptoethyl methanoate, 2-mercaptoethyl ethanoate, 2-mercaptoethyl propionate, 2-mercaptoethyl butanoate, 2-mercaptoethyl pentanoate, 2-mercaptoethyl hexanoate, 2-mercaptoethyl heptanoate, 2-mercaptoethyl octanoate, or 2-mercaptomethyl octanoate, with 2-ethylhexyl 3-mercaptopropionate or 2-mercaptoethyl octanoate being preferred. Each of these compounds may be used alone, or two or more of these may be used in combination.

The weight average molecular weight (Mw) of the copolymer is preferably 5,000 or more, more preferably 50,000 or more, still more preferably 100,000 or more, particularly preferably 300,000 or more, most preferably 450,000 or more. The Mw is also preferably 2,000,000 or less, more preferably 1,500,000 or less, still more preferably 1,000,000 or less, particularly preferably 700,000 or less. If the Mw is less than 5,000, fuel economy and abrasion resistance may deteriorate. If the Mw is more than 2,000,000, processability may deteriorate.

The ratio of the Mw to the number average molecular weight (Mn) of the copolymer, that is, the molecular weight distribution (Mw/Mn), is preferably 2.1 or more, more preferably 2.5 or more, still more preferably 3.0 or more, particularly preferably 3.8 or more. The Mw/Mn is also preferably 11 or less, more preferably 8.0 or less, still more preferably 5.0 or less. If the Mw/Mn is less than 2.1, processability may deteriorate. If the Mw/Mn is more than 11, fuel economy may deteriorate.

The Mw and Mn values are determined using a gel permeation chromatograph (GPC) with polystyrene standards.

The copolymer preferably has a glass transition temperature (Tg) of −100° C. to 100° C., more preferably −70° C. to 0° C. When the Tg falls within the range indicated above, the effects of the present invention can be sufficiently achieved.

The Tg values are measured with a differential scanning calorimeter (Q200, available from TA Instruments, Japan) at a temperature increase rate of 10° C./min in accordance with JIS K 7121:1987.

The copolymer preferably has a Mooney viscosity, $ML_{1+4}$, at 130° C. of 30 to 100, more preferably 40 to 80. When the $ML_{1+4}$ falls within the range indicated above, the effects of the present invention can be sufficiently achieved.

The Mooney viscosity ($ML_{1+4}$, 130° C.) values are determined by measuring Mooney viscosity at 130° C. in accordance with JIS K 6300.

In the rubber composition of the present invention, the amount of the copolymer per 100% by mass of the rubber component is preferably 1% by mass or more, more preferably 50% by mass or more, still more preferably 70% by mass or more, particularly preferably 80% by mass or more, and may be 100% by mass. Less than 1% by mass of the copolymer may be too small to achieve the effects of the present invention.

Examples of other rubber materials that can be used in combination with the copolymer as the rubber component in the present invention include diene rubbers such as natural rubber (NR), polyisoprene rubber (IR), polybutadiene rubber (BR), styrene-butadiene rubber (SBR), styrene-isoprene rubber (SIR), styrene-isoprene-butadiene rubber (SIBR), ethylene-propylene-diene rubber (EPDM), chloroprene rubber (CR), acrylonitrile-butadiene rubber (NBR), and butyl rubber (IIR). Each of these diene rubbers may be used alone, or two or more of these may be used in combination.

The rubber composition of the present invention contains carbon black and/or silica as filler.

The carbon black may be one commonly used in tire production, and examples include SAF, ISAF, HAF, FF, FEF, and GPF. Each of these carbon blacks may be used alone, or two or more of these may be used in combination.

The carbon black preferably has a nitrogen adsorption specific surface area ($N_2SA$) of 80 m$^2$/g or more, more preferably 100 m$^2$/g or more. The $N_2SA$ is also preferably 200 m$^2$/g or less, more preferably 150 m$^2$/g or less. Carbon black having a $N_2SA$ of less than 80 m$^2$/g tends to provide low reinforcing properties, thus failing to sufficiently improve abrasion resistance. Carbon black having a $N_2SA$ of more than 200 m$^2$/g tends to disperse poorly, thereby resulting in deterioration of fuel economy.

The $N_2SA$ of carbon black can be measured in accordance with JIS K 6217-2:2001.

The carbon black preferably has a dibutyl phthalate oil absorption (DBP) of 50 mL/100 g or more, more preferably 100 mL/100 g or more. The DBP is also preferably 200 mL/100 g or less, more preferably 150 mL/100 g or less. Carbon black having a DBP of less than 50 mL/100 g may fail to provide sufficient reinforcing properties, resulting in a decrease in abrasion resistance. Carbon black having a DBP of more than 200 mL/100 g may have reduced dispersibility, thereby resulting in deterioration of fuel economy.

The DBP of carbon black can be measured in accordance with JIS K 6217-4:2001.

The amount of carbon black per 100 parts by mass of the rubber component is preferably 1 part by mass or more, more preferably 3 parts by mass or more. The amount is also preferably 50 parts by mass or less, more preferably 30 parts by mass or less, still more preferably 20 parts by mass or less. If the amount is less than 1 part by mass, abrasion resistance may deteriorate. If the amount is more than 50 parts by mass, fuel economy may deteriorate.

Non-limiting examples of the silica include dry silica (anhydrous silicic acid) and wet silica (hydrous silicic acid). Wet silica is preferred because it has a large number of silanol groups.

The silica preferably has a $N_2SA$ of 100 m$^2$/g or more, more preferably 150 m$^2$/g or more. The $N_2SA$ is also preferably 300 m$^2$/g or less, more preferably 200 m$^2$/g or less. Silica having a $N_2SA$ of less than 100 m$^2$/g tends to produce a small reinforcing effect, thus failing to sufficiently improve abrasion resistance. Silica having a $N_2SA$ of more than 300 m$^2$/g tends to disperse poorly, thereby resulting in deterioration of fuel economy.

The $N_2SA$ of silica can be measured in accordance with ASTM D3037-81.

The amount of silica per 100 parts by mass of the rubber component is preferably 1 part by mass or more, more preferably 10 parts by mass or more, still more preferably 30 parts by mass or more, particularly preferably 50 parts by mass or more. The amount is also preferably 150 parts by mass or less, more preferably 100 parts by mass or less. If the amount is less than 1 part by mass, sufficient fuel economy and sufficient abrasion resistance tend not to be obtained. If the amount is more than 150 parts by mass, the silica tends to have poor dispersibility, resulting in deterioration of processability.

The rubber composition of the present invention preferably contains a silane coupling agent together with silica.

The silane coupling agent may be any silane coupling agent conventionally used in combination with silica in the rubber industry. Examples include sulfide silane coupling agents such as bis(3-triethoxysilylpropyl)tetrasulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Preferred among these are sulfide silane coupling agents, with bis(3-triethoxysilylpropyl)tetrasulfide being more preferred.

When a silane coupling agent is contained, the amount of silane coupling agent per 100 parts by mass of silica is preferably 1 part by mass or more, more preferably 2 parts by mass or more. The amount is also preferably 20 parts by mass or less, more preferably 15 parts by mass or less. If the amount is less than 1 part by mass, the effect of improving dispersibility, and other effects tend not to be sufficiently achieved. If the amount is more than 20 parts by mass, the coupling effect tends to be insufficient, thereby resulting in a decrease in reinforcing properties.

The rubber composition of the present invention may optionally incorporate compounding agents conventionally used in the rubber industry, in addition to the components described above. Examples include other reinforcing fillers, antioxidants, oils, waxes, vulcanizing agents such as sulfur, and vulcanization accelerators.

The rubber composition of the present invention may be used in treads (cap treads, base treads), sidewalls, and other components of tires and is suitable especially for treads, particularly cap treads.

The pneumatic tire of the present invention can be produced from the above-described rubber composition by usual methods.

Specifically, the rubber composition containing the components described above, before vulcanization, is extruded and processed into the shape of a tire component, e.g. a tread and assembled with other tire components on a tire building machine in a usual manner to build an unvulcanized tire. The unvulcanized tire is heated and pressurized in a vulcanizer to obtain a tire.

The pneumatic tire of the present invention is suitable for passenger vehicles, large passenger vehicles, large SUVs, heavy load vehicles such as trucks and buses, and light trucks, and may be used as a winter tire or studless winter tire for these vehicles.

EXAMPLES

The present invention is specifically described with reference to examples but is not limited thereto.

The chemicals used in production examples are listed below.

Ion-exchanged water: In-house product

Potassium rosinate soap: available from Harima Chemicals Group, Inc.

Fatty acid sodium soap: available from Wako Pure Chemical Industries, Ltd.

Potassium chloride: available from Wako Pure Chemical Industries, Ltd.

Sodium naphthalenesulfonate-formaldehyde condensate: available from Kao Corporation 1,3-Butadiene: 1,3-Butadiene available from Takachiho Trading Co., Ltd.

Styrene: Styrene available from Wako Pure Chemical Industries, Ltd. (a compound represented by formula (2))

t-Dodecyl mercaptan: tert-Dodecyl mercaptan available from Wako Pure Chemical Industries, Ltd. (chain transfer agent)

Si363: 3-[Ethoxybis(3,6,9,12,15-pentaoxaoctacosan-1-yloxy)silyl]-1-propanethiol available from Degussa (chain transfer agent, a compound represented by the formula below, a compound of formula (3))

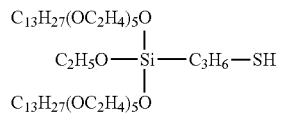

3-Mercaptopropyltriethoxysilane: available from Tokyo Chemical Industry Co., Ltd. (chain transfer agent, a compound represented by formula (3))

2-Ethylhexyl 3-mercaptopropionate: available from Tokyo Chemical Industry Co., Ltd. (chain transfer agent, a compound represented by formula (4))

2-Mercaptoethyl octanoate: available from Tokyo Chemical Industry Co., Ltd. (chain transfer agent, a compound represented by formula (4))

Sodium hydrosulfide: available from Wako Pure Chemical Industries, Ltd.

$FeSO_4$: Ferric sulfate available from Wako Pure Chemical Industries, Ltd.

EDTA: Sodium ethylenediaminetetraacetate available from Wako Pure Chemical Industries, Ltd.

Rongalite: Sodium formaldehyde sulfoxylate available from Wako Pure Chemical Industries, Ltd.

Polymerization initiator: PERMENTA H (Paramenthane hydroperoxide) available from NOF Corporation N,N-Diethylhydroxylamine: available from Wako Pure Chemical Industries, Ltd.

2,6-Di-t-butyl-p-cresol: Sumilizer BHT available from Sumitomo Chemical Co., Ltd.

Diethyl fumarate: available from Tokyo Chemical Industry Co., Ltd.

(Preparation of Emulsifier)

An emulsifier was prepared by adding 9,356 g of ion-exchanged water, 1,152 g of potassium rosinate soap, 331 g of fatty acid sodium soap, 51 g of potassium chloride, and 30 g of sodium naphthalenesulfonate-formaldehyde condensate, followed by stirring at 70° C. for 2 hours.

Production Example 1

A 50 L (interior volume) stainless steel polymerization reactor was cleaned, dried, and purged with dry nitrogen. Then, the reactor was charged with 3,500 g of 1,3-butadiene, 1,500 g of styrene, 5.74 g of t-dodecyl mercaptan, 9,688 g of the emulsifier, 6.3 mL of sodium hydrosulfide (1.8 M), 6.3 mL each of the activators ($FeSO_4$/EDTA/Rongalite), and 6.3 mL of the polymerization initiator (2.3 M), followed by polymerization at 10° C. for 3 hours with stirring. After the completion of the polymerization, 2.9 g of N,N-diethylhydroxylamine was added to the reaction mixture and they were reacted for 30 minutes. The contents were taken out from the polymerization reactor and combined with 10 g of 2,6-di-t-butyl-p-cresol. After most of the water was evaporated off, the residue was dried under reduced pressure at 55° C. for 12 hours to obtain a copolymer 1.

Production Example 2

A copolymer 2 was prepared in the same manner as in Production Example 1, except that 1,500 g of diethyl fumarate was used instead of 1,500 g of styrene.

Production Example 3

A copolymer 3 was prepared in the same manner as in Production Example 1, except that 1,500 g of diethyl fumarate was used instead of 1,500 g of styrene, and 6.11 g of Si363 was used instead of 5.74 g of t-dodecyl mercaptan.

Production Example 4

A copolymer 4 was prepared in the same manner as in Production Example 1, except that 1,500 g of diethyl fumarate was used instead of 1,500 g of styrene, and 1.48 g of 3-mercaptopropyltriethoxysilane was used instead of 5.74 g of t-dodecyl mercaptan.

Production Example 5

A copolymer 5 was prepared in the same manner as in Production Example 1, except that 1,500 g of diethyl fumarate was used instead of 1,500 g of styrene, and 1.35 g of 2-ethylhexyl 3-mercaptopropionate was used instead of 5.74 g of t-dodecyl mercaptan.

Production Example 6

A copolymer 6 was prepared in the same manner as in Production Example 1, except that 1,500 g of diethyl fumarate was used instead of 1,500 g of styrene, and 1.26 g of 2-mercaptoethyl octanoate was used instead of 5.74 g of t-dodecyl mercaptan.

Production Example 7

A copolymer 7 was prepared in the same manner as in Production Example 1, except that 750 g out of 1,500 g of styrene was replaced with 750 g of diethyl fumarate.

Production Example 8

A copolymer 8 was prepared in the same manner as in Production Example 1, except that 750 g out of 1,500 g of styrene was replaced with 750 g of diethyl fumarate, and 6.11 g of Si363 was used instead of 5.74 g of t-dodecyl mercaptan.

Production Example 9

A copolymer 9 was prepared in the same manner as in Production Example 1, except that 750 g out of 1,500 g of styrene was replaced with 750 g of diethyl fumarate, and 1.48 g of 3-mercaptopropyltriethoxysilane was used instead of 5.74 g of t-dodecyl mercaptan.

Production Example 10

A copolymer 10 was prepared in the same manner as in Production Example 1, except that 750 g out of 1,500 g of styrene was replaced with 750 g of diethyl fumarate, and 1.35 g of 2-ethylhexyl 3-mercaptopropionate was used instead of 5.74 g of t-dodecyl mercaptan.

Production Example 11

A copolymer 11 was prepared in the same manner as in Production Example 1, except that 750 g out of 1,500 g of styrene was replaced with 750 g of diethyl fumarate, and 1.26 g of 2-mercaptoethyl octanoate was used instead of 5.74 g of t-dodecyl mercaptan.

Table 1 shows the amount of butadiene (conjugated diene monomer), amount of diethyl fumarate (compound of formula (1)), amount of styrene, Mw, and Mw/Mn of the copolymers 1 to 11 prepared in Production Examples 1 to 11. These values were determined as collectively described below.

(Amounts of Monomer Units)

A $^1$H-NMR spectrum was measured using a JNM-A 400 NMR spectrometer (available from JEOL) at 25° C. This spectrum was used to calculate the ratio of the phenyl protons of the styrene unit at 6.5 to 7.2 ppm, the vinyl protons of the butadiene unit at 4.9 to 5.4 ppm, and the ester protons of the compound unit of formula (1) at 1.5 to 2.5 ppm. Then, the amounts of the monomer units were determined from the ratio.

(Determination of Weight Average Molecular Weight (Mw) and Number Average Molecular Weight (Mn))

The weight average molecular weight (Mw) and number average molecular weight (Mn) of the copolymers were determined using a gel permeation chromatograph (GPC) (GPC-8000 series available from Tosoh Corporation, detector: differential refractometer, column: TSKGEL SUPERMULTIPORE HZ-M available from Tosoh Corporation) with polystyrene standards.

TABLE 1

| | Production Example 1 (Copolymer 1) | Production Example 2 (Copolymer 2) | Production Example 3 (Copolymer 3) | Production Example 4 (Copolymer 4) | Production Example 5 (Copolymer 5) | Production Example 6 (Copolymer 6) | Production Example 7 (Copolymer 7) | Production Example 8 (Copolymer 8) | Production Example 9 (Copolymer 9) | Production Example 10 (Copolymer 10) | Production Example 11 (Copolymer 11) |
|---|---|---|---|---|---|---|---|---|---|---|---|
| Butadiene (conjugated diene monomer) content (% by mass) | 76 | 76 | 76 | 76 | 76 | 76 | 76 | 76 | 76 | 76 | 76 |
| Diethyl fumarate (formula (1)) content (% by mass) | — | 24 | 24 | 24 | 24 | 24 | 12 | 12 | 12 | 12 | 12 |
| Styrene content (% by mass) | 24 | — | — | — | — | — | 12 | 12 | 12 | 12 | 12 |

TABLE 1-continued

| | Production Example 1 (Copolymer 1) | Production Example 2 (Copolymer 2) | Production Example 3 (Copolymer 3) | Production Example 4 (Copolymer 4) | Production Example 5 (Copolymer 5) | Production Example 6 (Copolymer 6) | Production Example 7 (Copolymer 7) | Production Example 8 (Copolymer 8) | Production Example 9 (Copolymer 9) | Production Example 10 (Copolymer 10) | Production Example 11 (Copolymer 11) |
|---|---|---|---|---|---|---|---|---|---|---|---|
| Weight average molecular weight (Mw) | 510,000 | 500,000 | 530,000 | 520,000 | 520,000 | 520,000 | 550,000 | 540,000 | 530,000 | 530,000 | 530,000 |
| Molecular weight distribution (Mw/Mn) | 3.6 | 4.3 | 4.5 | 4.4 | 4.3 | 4.7 | 3.9 | 4.0 | 4.0 | 3.9 | 4.2 |

The chemicals used in examples and comparative example were listed below.

Copolymers: Copolymers 1 to 11 prepared in Production Examples 1 to 11

Carbon black: SHOBLACK N220 ($N_2SA$: 111 $m^2/g$, DBP: 115 mL/100 g) available from Cabot Japan K.K.

Silica: ULTRASIL VN3 ($N_2SA$: 175 $m^2/g$) available from Degussa

Silane coupling agent: Si69 (bis(3-triethoxysilylpropyl) tetrasulfide) available from Degussa Zinc oxide: Zinc oxide #1 available from Mitsui Mining and Smelting Co., Ltd.

Stearic acid: Stearic acid available from NOF Corporation

Antioxidant: NOCRAC 6C (N-1,3-dimethylbutyl-N'-phenyl-p-phenylenediamine) available from Ouchi Shinko Chemical Industrial Co., Ltd.

Wax: Sunnoc Wax available from Ouchi Shinko Chemical Industrial Co., Ltd.

Vulcanization accelerator 1: Nocceler CZ (N-cyclohexyl-2-benzothiazolylsulfenamide) available from Ouchi Shinko Chemical Industrial Co., Ltd.

Vulcanization accelerator 2: Nocceler D (N,N'-diphenylguanidine) available from Ouchi Shinko Chemical Industrial Co., Ltd.

Sulfur: Sulfur powder available from Tsurumi Chemical Industry Co., Ltd.

Examples and Comparative Example

According to the formulations shown in Table 2, the chemicals other than the sulfur and vulcanization accelerators were kneaded using a Banbury mixer at 150° C. for 5 minutes. To the kneaded mixture were added the sulfur and vulcanization accelerators, and they were kneaded using an open roll mill at 170° C. for 12 minutes to obtain an unvulcanized rubber composition.

The unvulcanized rubber composition was press-vulcanized at 170° C. for 20 minutes to obtain a vulcanized rubber composition.

The unvulcanized rubber compositions and vulcanized rubber compositions thus prepared were evaluated as follows. Table 2 shows the results.

(Processability)

Each unvulcanized rubber composition was measured for Mooney viscosity at 100° C. in accordance with JIS K 6300. A lower value indicates better processability.

(Fuel Economy)

The tan δ of each vulcanized rubber composition was measured using the viscoelasticity spectrometer VES (Iwamoto Seisakusho Co., Ltd.) at a temperature of 60° C., an initial strain of 10%, and a dynamic strain of 2%. A lower tan δ indicates better fuel economy.

(Wet Grip Performance)

A viscoelastic parameter was determined for specimens prepared from each vulcanized rubber composition, using a viscoelastometer (ARES, available from Rheometric Scientific) in a torsional mode. The tan δ was measured at 0° C., a frequency of 10 Hz, and a strain of 1%. A higher tan δ indicates better wet grip performance.

(Abrasion Resistance)

Using a Lambourn abrasion tester, the abrasion loss of each vulcanized rubber composition was measured at room temperature, an applied load of 1.0 kgf, and a slip ratio of 30% and expressed as an index using the equation below. A higher index indicates better abrasion resistance.

(Abrasion resistance index)=(Abrasion loss of Comparative Example 1)/(Abrasion loss in each formulation)×100

TABLE 2

| | | Comparative Example 1 | Example 1 | Example 2 | Example 3 | Example 4 | Example 5 |
|---|---|---|---|---|---|---|---|
| Formulation (parts by mass) | Copolymer | Copolymer 1 100 | Copolymer 2 100 | Copolymer 3 100 | Copolymer 4 100 | Copolymer 5 100 | Copolymer 6 100 |
| | Carbon black | 5 | 5 | 5 | 5 | 5 | 5 |
| | Silica | 75 | 75 | 75 | 75 | 75 | 75 |
| | Silane coupling agent | 6 | 6 | 6 | 6 | 6 | 6 |
| | Zinc oxide | 2 | 2 | 2 | 2 | 2 | 2 |
| | Stearic acid | 2 | 2 | 2 | 2 | 2 | 2 |
| | Antioxidant | 2 | 2 | 2 | 2 | 2 | 2 |
| | Wax | 2 | 2 | 2 | 2 | 2 | 2 |
| | Vulcanization accelerator 1 | 1.5 | 1.5 | 1.5 | 1.5 | 1.5 | 1.5 |

TABLE 2-continued

|  |  |  |  |  |  |  |  |
|---|---|---|---|---|---|---|---|
|  | Vulcanization accelerator 2 | 2 | 2 | 2 | 2 | 2 | 2 |
|  | Sulfur | 1.5 | 1.5 | 1.5 | 1.5 | 1.5 | 1.5 |
| Evaluation | Processability | 61 | 40 | 50 | 51 | 53 | 48 |
|  | Fuel economy | 0.228 | 0.217 | 0.195 | 0.200 | 0.198 | 0.206 |
|  | Wet grip performance | 0.454 | 0.613 | 0.631 | 0.628 | 0.626 | 0.625 |
|  | Abrasion resistance | 100 | 125 | 130 | 126 | 126 | 128 |

|  |  | Example 6 | Example 7 | Example 8 | Example 9 | Example 10 |
|---|---|---|---|---|---|---|
| Formulation (parts by mass) | Copolymer | Copolymer 7 100 | Copolymer 8 100 | Copolymer 9 100 | Copolymer 10 100 | Copolymer 11 100 |
|  | Carbon black | 5 | 5 | 5 | 5 | 5 |
|  | Silica | 75 | 75 | 75 | 75 | 75 |
|  | Silane coupling agent | 6 | 6 | 6 | 6 | 6 |
|  | Zinc oxide | 2 | 2 | 2 | 2 | 2 |
|  | Stearic acid | 2 | 2 | 2 | 2 | 2 |
|  | Antioxidant | 2 | 2 | 2 | 2 | 2 |
|  | Wax | 2 | 2 | 2 | 2 | 2 |
|  | Vulcanization accelerator 1 | 1.5 | 1.5 | 1.5 | 1.5 | 1.5 |
|  | Vulcanization accelerator 2 | 2 | 2 | 2 | 2 | 2 |
|  | Sulfur | 1.5 | 1.5 | 1.5 | 1.5 | 1.5 |
| Evaluation | Processability | 45 | 55 | 56 | 58 | 53 |
|  | Fuel economy | 0.212 | 0.201 | 0.206 | 0.203 | 0.208 |
|  | Wet grip performance | 0.656 | 0.676 | 0.670 | 0.663 | 0.660 |
|  | Abrasion resistance | 120 | 126 | 124 | 124 | 125 |

Table 2 demonstrates that, in the examples in which the copolymers 2 to 11 synthesized by copolymerizing a conjugated diene monomer and a compound represented by the above formula (1) were incorporated with silica and carbon black, a balanced improvement in fuel economy, abrasion resistance, and wet grip performance was achieved while obtaining good processability.

The invention claimed is:

1. A pneumatic tire, comprising a tread formed from a rubber composition, the rubber composition comprising:
a copolymer synthesized by copolymerizing monomers consisting essentially of a conjugated diene monomer and a compound represented by the formula (1) below, or consisting essentially of a conjugated diene monomer, a compound represented by the formula (1) below and a compound represented by the formula (2) below; and
at least one of carbon black or silica,

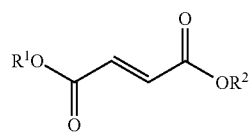

(1)

wherein $R^1$ and $R^2$ are the same or different and each represent a C1-C30 hydrocarbon group,

(2)

wherein $R^{21}$ represents a hydrogen atom, a C1-C3 aliphatic hydrocarbon group, a C3-C8 alicyclic hydrocarbon group, or a C6-C10 aromatic hydrocarbon group, and $R^{22}$ represents a hydrogen atom or a methyl group.

2. The pneumatic tire according to claim 1, wherein the copolymer comprises, per 100% by mass of structural units of the copolymer, 5% to 95% by mass of units derived from the conjugated diene monomer and 5% to 95% by mass of units derived from the compound of formula (1).

3. The pneumatic tire according to claim 1, wherein the copolymer is synthesized by emulsion polymerization, and the copolymer has a weight average molecular weight of 5,000 to 2,000,000 and a molecular weight distribution of 2.1 to 11.

4. The pneumatic tire according to claim 1, wherein $R^1$ and $R^2$ are ethyl groups.

5. The pneumatic tire according to claim 1, wherein the conjugated diene monomer is 1,3-butadiene.

6. The pneumatic tire according to claim 1, wherein the copolymer is synthesized using as a chain transfer agent a compound that contains a functional group having an affinity for filler, and a mercapto group.

7. The pneumatic tire according to claim 1, wherein the copolymer comprises, per 100% by mass of structural units of the copolymer, 1% to 50% by mass of units derived from the compound of formula (2).

8. The pneumatic tire according to claim 1, wherein the copolymer comprises, per 100% by mass of structural units of the copolymer, 5% to 95% by mass of the combined amount of units derived from the compound of formula (1) and the compound of formula (2).

9. The pneumatic tire according to claim 1, wherein the compound of formula (1) comprises at least one compound selected from, dimethyl fumarate, diethyl fumarate, monopropyl fumarate, dipropyl fumarate, diisopropyl fumarate, dibutyl fumarate, and 1-ethyl-4-methyl fumarate.

10. The pneumatic tire according to claim 9, wherein the compound of formula (2) comprises a compound selected from styrene, 2-methylstyrene, 3-methylstyrene, 4-methylstyrene, α-methylstyrene, 2,4-dimethylstyrene, vinylethylbenzene, α-vinylnaphthalene, β-vinylnaphthalene, and vinylxylene.

11. The pneumatic tire according to claim 1, wherein the compound of formula (2) comprises a compound selected from styrene, 2-methylstyrene, 3-methylstyrene, 4-methylstyrene, α-methylstyrene, 2,4-dimethylstyrene, vinylethylbenzene, α-vinylnaphthalene, β-vinylnaphthalene, and vinylxylene.

* * * * *